May 17, 1966     S. ROTSCHILD     3,251,714
METHOD OF PREPARING A CADMIUM OXIDE PHOTOCONDUCTOR
Filed July 13, 1962
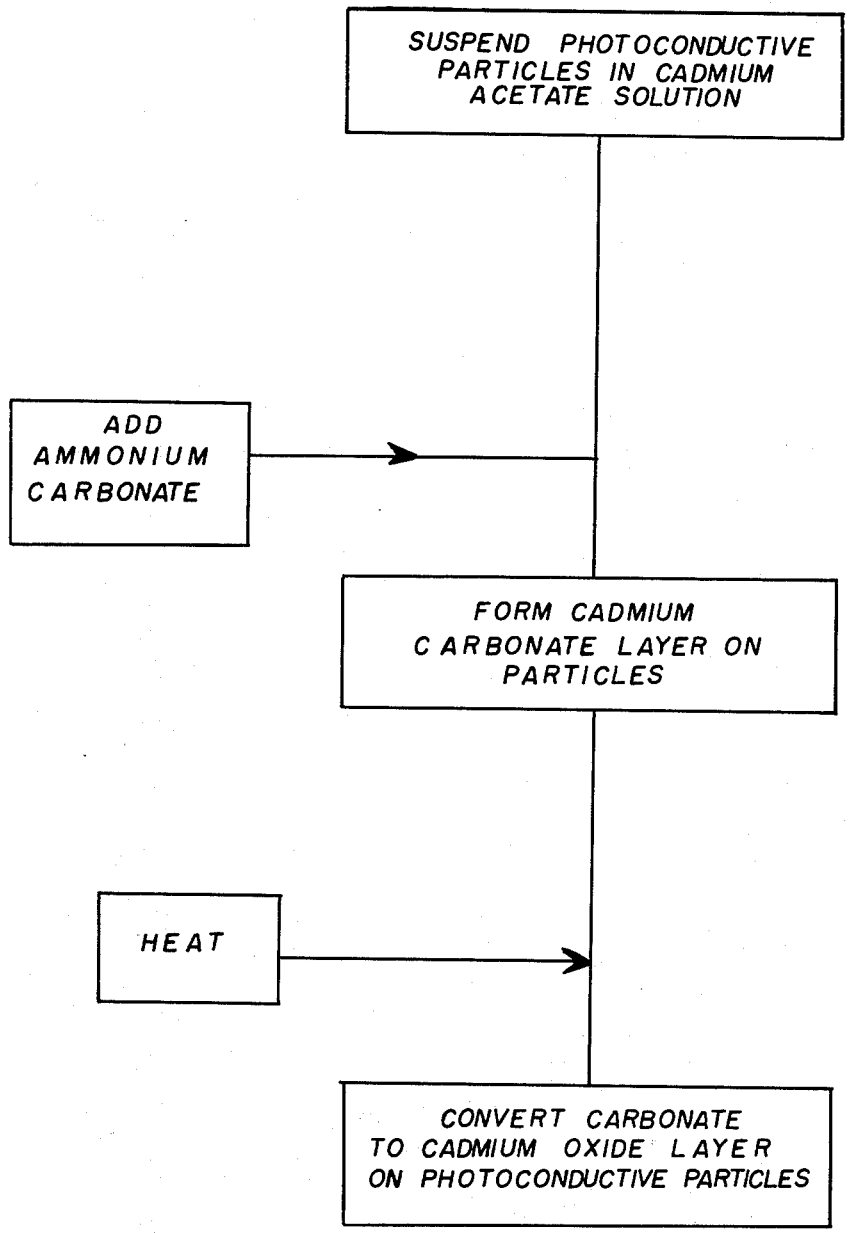
INVENTOR.
SIEGFRIED ROTSCHILD
BY
AGENT

3,251,714
METHOD OF PREPARING A CADMIUM OXIDE PHOTOCONDUCTOR

Siegfried Rotschild, Wallington, Surrey, England, assignor to North American Philips Company Inc., New York, N.Y., a corporation of Delaware
Filed July 13, 1962, Ser. No. 209,765
Claims priority, application Great Britain, July 13, 1961, 25,415/61
2 Claims. (Cl. 117—201)

This invention relates to photoconductors which comprise zinc and/or cadmium sulphide, selenide and/or telluride, or mixed crystals of these compounds and is concerned with a process for sensitising such photoconductors.

According to the present invention there is provided a process for the treatment of photoconductive substances in particulate form and comprising zinc and/or cadmium sulphide, selenide and/or telluride, mixtures or mixed crystals of these compounds, which process comprises coating the particles by chemical precipitation with a cadmium compound decomposable to cadmium oxide by heating, drying, and then heating to effect such decomposition leaving a layer of cadmium oxide on the particles.

The heating is effected at a temperature lower than those used in firing operations in preparing the starting materials to be treated, so that the heating step comprised in the process according to the invention does not cause substantially further reaction in the body of the photoconductors. Suitable temperatures, which are dependent inter alia on the batch size, may for instance be chosen between 400° C. and 600° C., such as about 550° C. or somewhat lower. The heating is effected in a protective atmosphere such as, for example, nitrogen or other inert gas.

The cadmium oxide layers produced on the particles may represent an amount of about 0.5% by weight of the total weight of the phosphor, varying somewhat dependent on the particle size.

A specific example of the process embodying the invention will now be described by way of example.

Example

A photoconductive cadmium sulphide in particulate form is coated with cadmium oxide by suspending in a solution of 1 gm. of cadmium acetate in 75 cc. of distilled water, and adding, with stirring, a solution of 3 gms. of ammonium carbonate in 75 cc. of water, then filtering off, washing free of water-soluble salts, drying, and heating for one hour in nitrogen at 550° C., and then cooling rapidly. The final product is very suitable for use in photoconductive devices as the photoconductor, and the process described is well reproducible. In the example, the ammonium carbonate is the precipitating compound, and the water insoluble compound produced is cadmium carbonate, which upon heating decomposes to cadmium oxide.

The starting material is advantageously a cadmium sulphide activated by copper and containing bromine and gallium as coactivators prepared as described in our copending application of even date, Serial No. 209,764, as follows.

0.5 mol of pure cadmium sulphide is mixed with a solution of copper sulphate containing $1 \times 10^{-4}$ gm.-atom of copper and 0.025 mol of ammonium bromide in distilled water. The resulting mixture is dried and then fired in dry oxygen-free nitrogen at a temperature of 800° C. for one hour. $0.95 \times 10^{-4}$ gm.-atom of gallium, as the sulphate, is then added, and the dry material is then refired in dry oxygen-free nitrogen for one hour at a temperature of 850° C.

Reference is made to the accompanying drawing, which shows a flow diagram illustrating the steps of the inventive method.

What is claimed is:

1. A process for the sensitizing of photoconductive substances selected from the group consisting of zinc sulphide, cadmium sulphide, zinc selenide, cadmium selenide, zinc telluride, and cadmium telluride, comprising suspending particles of the said photoconductive substance in a solution of cadmium acetate capable of precipitating a heat-decomposable, water-insoluble cadmium compound, adding to the solution ammonium carbonate to precipitate the said heat-decomposable, water-insoluble compound to form a layer of the latter on the particles, and thereafter converting the said layer to cadmium oxide at a temperature preventing substantially further reaction of the photoconductive substance.

2. A process as claimed in claim 1 wherein the coated particles are heated at approximately 550° C. in an atmosphere of nitrogen to convert the water-insoluble cadmium compound to cadmium oxide.

References Cited by the Examiner
UNITED STATES PATENTS

| | | | |
|---|---|---|---|
| 1,971,053 | 8/1934 | Ruben | 117—201 |
| 2,884,507 | 4/1959 | Czipott et al. | 117—201 |

FOREIGN PATENTS

| | | |
|---|---|---|
| 521,099 | 5/1940 | Great Britain. |
| 612,270 | 11/1948 | Great Britain. |

RICHARD D. NEVIUS, *Primary Examiner.*

WILLIAM D. MARTIN, *Examiner.*

W. L. JARVIS, *Assistant Examiner.*